United States Patent
Ouyang et al.

(10) Patent No.: US 8,100,719 B2
(45) Date of Patent: Jan. 24, 2012

(54) ELECTRONIC DEVICE WITH GROUNDING MECHANISM

(75) Inventors: Zhi-Bin Ouyang, Shenzhen (CN);
Zhi-Xu Zheng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/758,109

(22) Filed: Apr. 12, 2010

(65) Prior Publication Data

US 2011/0124246 A1    May 26, 2011

(30) Foreign Application Priority Data

Nov. 26, 2009    (CN) .......................... 2009 1 0310479

(51) Int. Cl.
*H01R 13/648* (2006.01)
(52) U.S. Cl. .................................................. 439/607.33
(58) Field of Classification Search ............. 439/607.01, 439/630–632, 607.33
See application file for complete search history.

(56) References Cited

U.S. PATENT DOCUMENTS

| | | | | |
|---|---|---|---|---|
| 5,632,634 A * | 5/1997 | Soes | ............................. | 439/101 |
| 5,747,735 A * | 5/1998 | Chang et al. | .................... | 174/51 |
| 5,954,540 A * | 9/1999 | Wu | .......................... | 439/607.53 |
| 6,343,941 B1 * | 2/2002 | Kan | ................................ | 439/95 |
| 6,929,513 B2 * | 8/2005 | Fan | ................................ | 439/630 |
| 7,467,963 B2 * | 12/2008 | Chen | ............................ | 439/328 |
| 7,553,189 B2 * | 6/2009 | Tseng et al. | ............ | 439/607.14 |
| 7,651,372 B2 * | 1/2010 | Matsuzaki et al. | ....... | 439/607.01 |
| 7,661,989 B1 * | 2/2010 | He et al. | .................... | 439/607.33 |
| 7,962,932 B2 * | 6/2011 | Singh | ............................ | 725/32 |

* cited by examiner

*Primary Examiner* — Truc Nguyen
(74) *Attorney, Agent, or Firm* — Altis Law Group, Inc.

(57) ABSTRACT

A grounding mechanism is attached to a housing of an electronic device. The housing includes a receiving portion. The grounding mechanism includes an elastic member. The elastic member includes a main portion fixed to the receiving portion of the housing; a first bent portion and a latching plate extending from one side of the main portion, the first bent portion being in an acute angle with the main portion; and a second bent portion extending from another side of the main portion, the second bent portion having a projection.

9 Claims, 5 Drawing Sheets

ELECTRONIC DEVICE WITH GROUNDING MECHANISM

BACKGROUND

1. Technical Field

The present disclosure relates to electronic devices and, particularly, to an electronic device with a simple grounding mechanism.

2. Description of Related Art

Electronic devices usually include a plurality of electrical components provided therein so as to realize different functions. In order to prevent electrostatic charges from damaging the electrical components, a grounding mechanism is usually provided for removal of electromagnetic interference and electrostatic charges therefrom.

However, a conventional grounding structure of the electronic device complicates the assembly process. In addition, conventional grounding structures, by increasing the volume of the electronic device, can compromise requirements for the electronic device to be compact.

Therefore, there is room for improvement within the art.

BRIEF DESCRIPTION OF THE DRAWINGS

Many aspects of the grounding mechanism can be better understood with reference to the following drawings. The components in the drawings are not necessarily drawn to scale, the emphasis instead being placed upon clearly illustrating the principles of the present grounding mechanism. Moreover, in the drawings, like reference numerals designate corresponding parts throughout the several views.

DETAILED DESCRIPTION

The present grounding mechanism may be applied in many different electronic devices such as mobile phone, game device, PDA (personal digital assistant) and others. In an illustrated embodiment, the grounding mechanism is used in a mobile phone.

Figure 1:
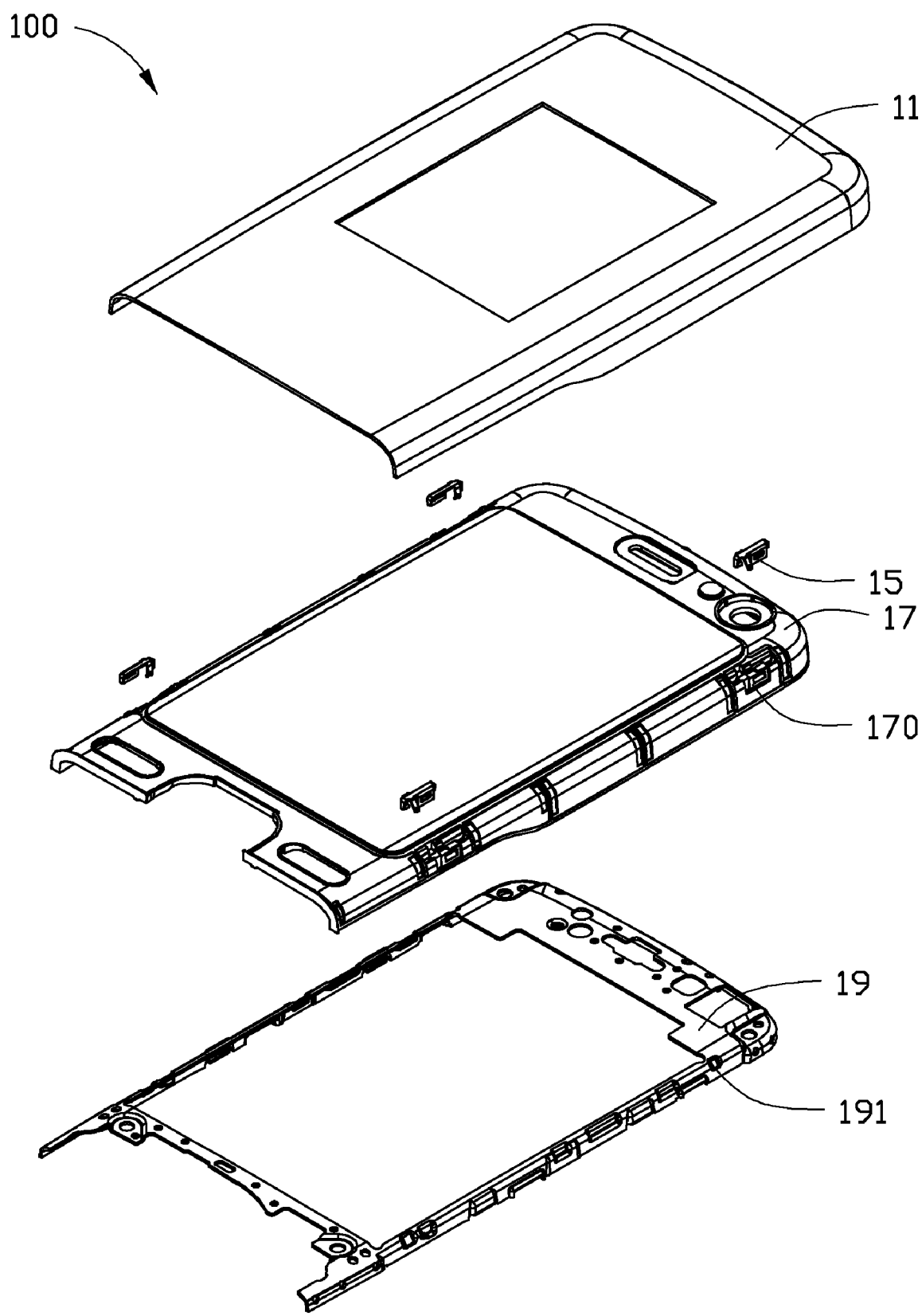
FIG. 1 is an exploded, isometric view of an electronic device using a grounding mechanism in accordance with an exemplary embodiment.

Referring to FIG. 1, the mobile phone 100 includes a cover 11, a plurality of elastic members 15, a housing 17 and a metal frame 19. The elastic members 15 conduct electromagnetic charges from the cover 11 to the metal frame 19 electronically connected to a ground of a circuit board (not shown).

Figure 2:
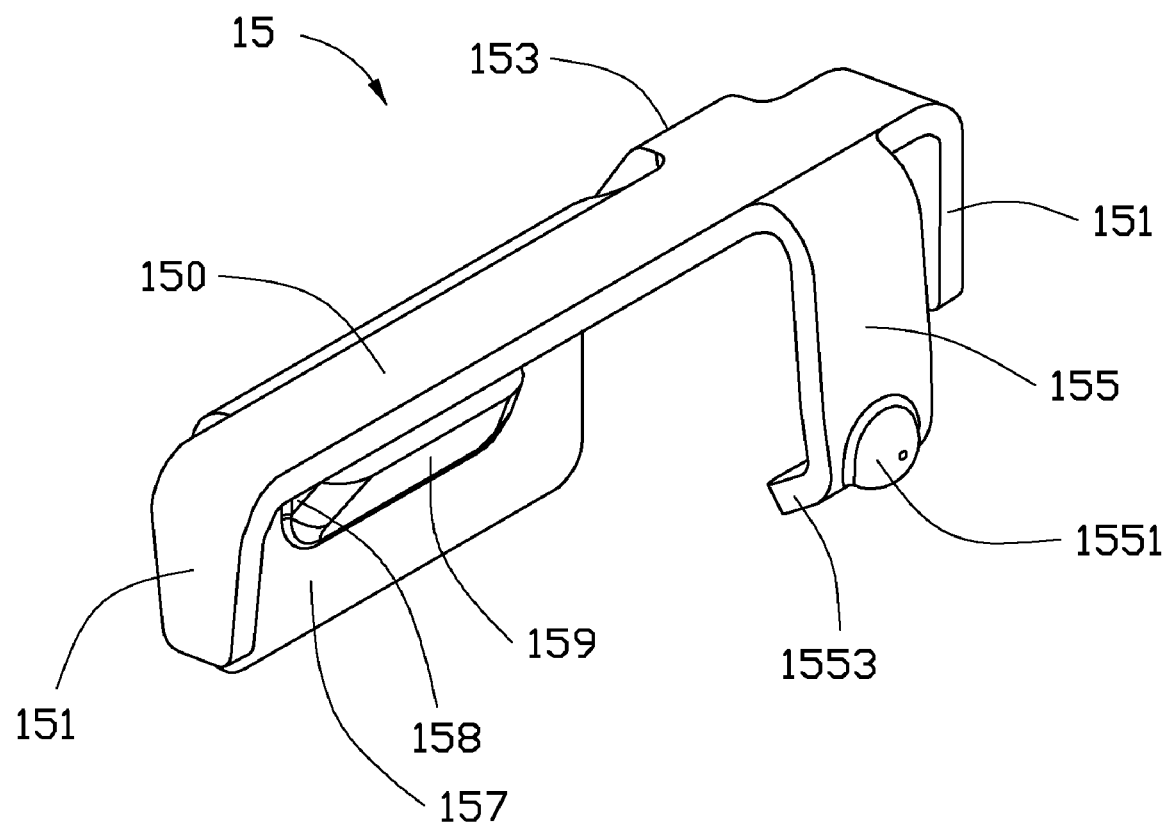
FIG. 2 is an enlarged view of an elastic member of FIG. 1.
Figure 3:
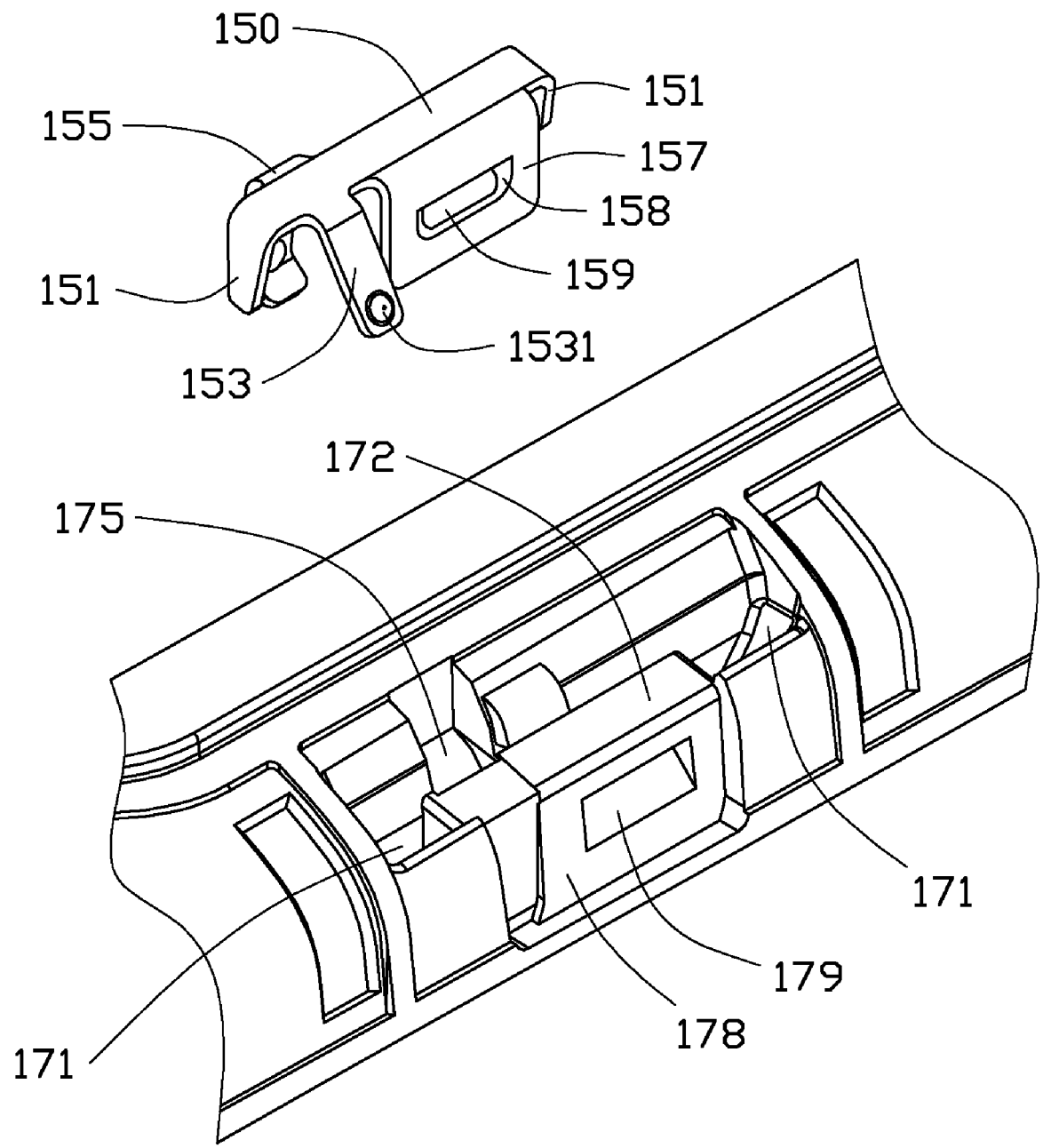
FIG. 3 is an enlarged view of the elastic member and the receiving portion of FIG. 1.

Referring to FIGS. 2 to 3, each elastic member 15 is metal, preferably stamped or punched from a sheet material. The elastic member 15 includes a main portion 150. Two latching portions 151 respectively extend perpendicular to two sides of the main portion 150. A first bent portion 153 and a second bent portion 155 respectively extend from two opposite ends of the main portion 150. The first bent portion 153 is at an approximately acute angle to the main portion 150. An arcuate protrusion 1531 extends from a distal end of the first bent portion 153. The second bent portion 155 is substantially perpendicular to the main portion 150, and has a finger end 1553 inclined toward the first bent portion 153. A hemispherical projection 1551 is formed at a connection between the finger end 1553 and the first bent portion 153. A latching plate 157 extends from the main portion 150 adjacent to the first bent portion 153. The latching plate 157 has an opening 158 and a wedge block 159 extends into the opening 158.

The housing 17 includes a plurality of receiving portions 170 for receiving the elastic members 15. Each receiving portion 150 has a support portion 172. Two opposite holes 171 are respectively defined at two sides of the support portion 172. An orifice 175 is defined at one end of the support portion 172, and a receiving groove 178 is defined at the other end of the support portion 172. A notch 179 is defined in the receiving groove 178 for receiving the wedge block 159.

The metal frame 19 is configured to be received in the housing 17. A plurality of slots 191 are defined in the metal frame 19 corresponding to the orifices 175 of the housing 17.

Figure 4:
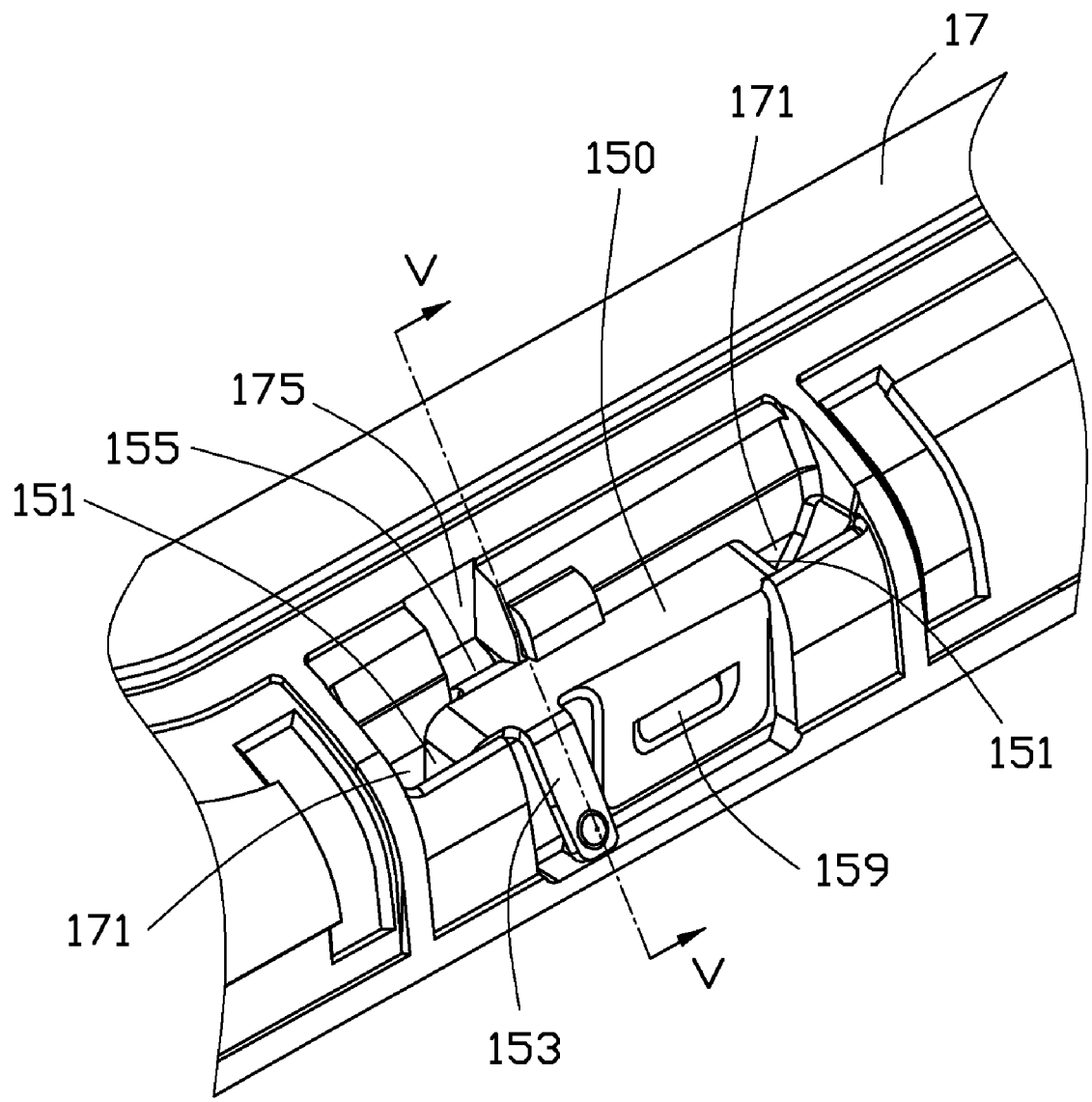
FIG. 4 is an assembled, schematic view of an electronic device.
Figure 5:
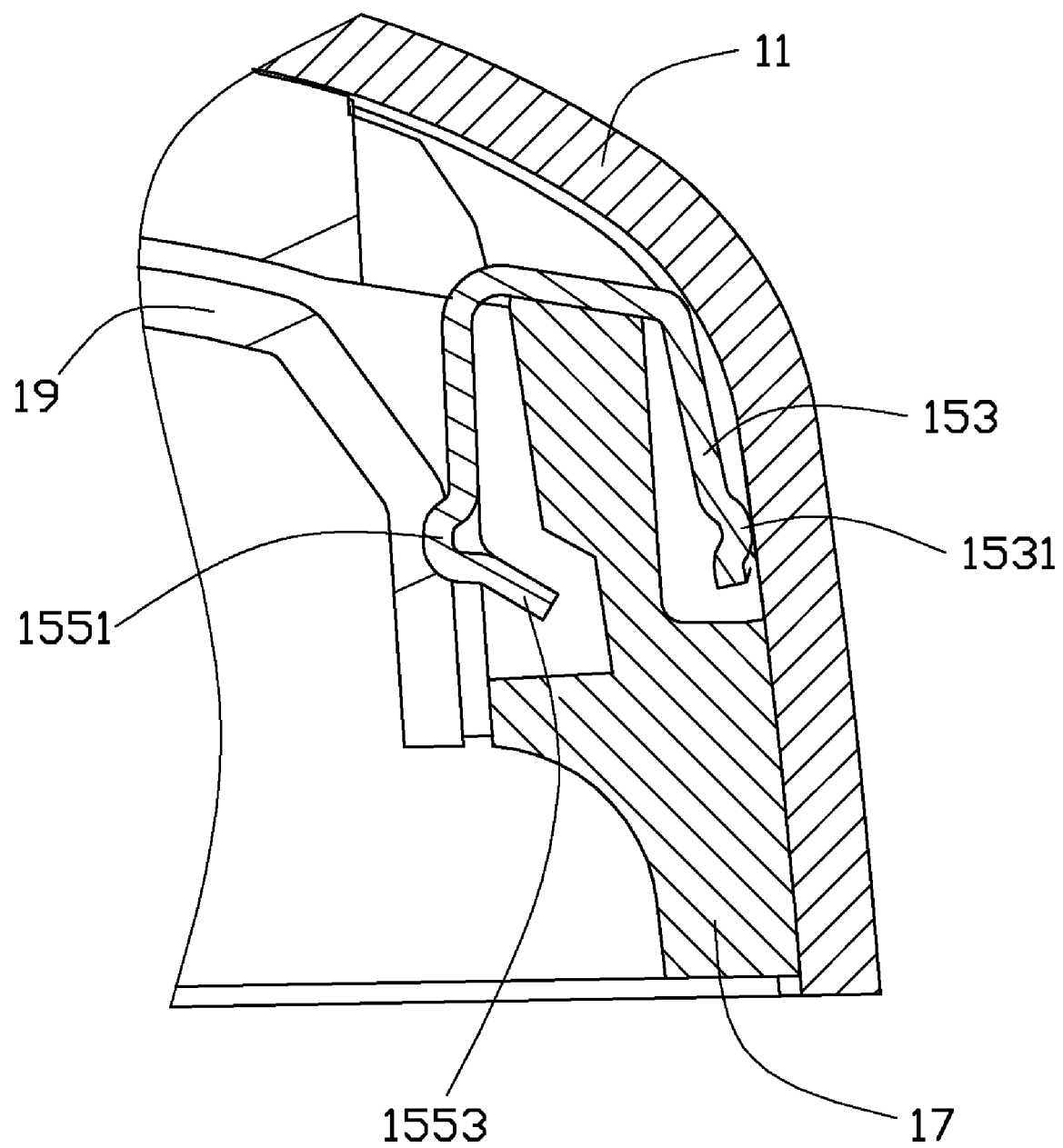
FIG. 5 is a cross-section of FIG. 4 along V-V line thereof.

In assembly, referring to FIGS. 4 and 5, the metal frame 19 is fixed in the housing 17 by e.g. adhesive. The orifices 175 of the housing 17 are aligned with the slots 191 of the metal frame 19. One of the elastic members 15 is aligned with one of the receiving portions. The main portion 150 contacts the support portion 172, and the two latching portions 151 are respectively received in the holes 171. The second bent portion 155 is received in a corresponding orifice 175, and elastically resists in the slot 191 of the metal frame 19. The latching plate 157 is latched in the receiving groove 178 and the wedge block 159 is latched in the notch 179. Then, the cover 11 is fixed to the housing 17 by a thermal bonding film. The arcuate protrusion 1531 of first bent portion 153 elastically resists the cover 11. Assembly of the other elastic members 15 is similar to that described, and thus is not detailed here. Therefore, the cover 11 and the metal frame 19 are electronically connected to a grounding pin of a main circuit board with the elastic members 15.

A significant advantage of the grounding mechanism is that the elastic members 15 are easily assembled to the housing 11. This simplifies assembly of the electronic device so that costs are reduced. In addition, space occupied in the interior of the electronic device is minimized.

It is to be understood, however, that even though numerous characteristics and advantages of the present disclosure have been set forth in the foregoing description, together with details of assembly and function, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A grounding mechanism attached to a housing of an electronic device, the housing including a receiving portion, the grounding mechanism comprising an elastic member, the elastic member comprising:
   a main portion fixed to the receiving portion of the housing;
   a first bent portion and a latching plate extending from one side of the main portion, the first bent portion forming an acute angle with the main portion, the latching plate comprising an opening into which a wedge block extends; and
   a second bent portion extending from another side of the main portion, the second bent portion comprising a projection;
   wherein the receiving portion defines a receiving groove into which the latching plate is received, and a notch, in which the wedge block is received.

2. The grounding mechanism as claimed in claim 1, wherein two latching portions respectively extend perpendicular to two sides of the main portion, and are fixed to the receiving portion.

3. The grounding mechanism as claimed in claim 1, wherein an arcuate protrusion extends from a distal end of the first bent portion.

4. The grounding mechanism as claimed in claim 1, wherein the second bent portion is substantially perpendicular to the main portion, and comprises a finger end inclined toward the first bent portion.

5. The grounding mechanism as claimed in claim 4, wherein the projection is formed at a connection between the finger end and the first bent portion.

6. An electronic device comprising:
   a cover;
   a housing forming a plurality of receiving portions;
   a metal frame receiving in the housing;
   a plurality of elastic members disposed between the cover and the metal frame, wherein each receiving portion comprises a support portion at one end of which an orifice is defined, and at the other end of which a receiving groove is defined, each elastic member includes a main portion, a first bent portion and a latching plate extending from one side of the main portion, the first bent portion is received in the orifice, and the latching plate is received in the receiving groove.

7. The electronic device as claimed in claim 6, wherein the first bent portion forms an acute angle with the main portion.

8. The electronic device as claimed in claim 6, wherein a notch is defined in the receiving groove, and the latching plate comprises a wedge block being received in the notch.

9. The electronic device as claimed in claim 6, wherein two opposite holes are respectively defined at two sides of the support portion, and two latching portions respectively extend perpendicular to two sides of the main portion, and are fixed to the receiving portion.

* * * * *